United States Patent
Hwang et al.

(10) Patent No.: US 6,898,003 B2
(45) Date of Patent: *May 24, 2005

(54) DISPERSION-COMPENSATED RAMAN OPTICAL FIBER AMPLIFIER

(75) Inventors: Seong-Taek Hwang, Pyongtaek-shi (KR); Hyung-lin Kwon, Yongin-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 241 days.

This patent is subject to a terminal disclaimer.

(21) Appl. No.: 10/284,787

(22) Filed: Oct. 31, 2002

(65) Prior Publication Data

US 2003/0156316 A1 Aug. 21, 2003

(30) Foreign Application Priority Data

Feb. 20, 2002 (KR) .......................................... 2002-8955

(51) Int. Cl.[7] .............................................. H01S 3/00
(52) U.S. Cl. .................................................. 359/337.5
(58) Field of Search ...................................... 359/337.5

(56) References Cited

U.S. PATENT DOCUMENTS 5,404,413 A * 4/1995 Delavaux et al. ............. 385/15
5,596,448 A * 1/1997 Onaka et al. ............ 359/337.5
5,598,294 A * 1/1997 Uno et al. ............. 359/337.21
6,785,043 B2 * 8/2004 Hwang et al. ........... 359/337.5

FOREIGN PATENT DOCUMENTS

EP 001339178 A1 * 8/2003

* cited by examiner

Primary Examiner—Mark Hellner
(74) Attorney, Agent, or Firm—Cha & Reiter, LLC.

(57) ABSTRACT

Disclosed is a dispersion-compensating, Raman optical fiber amplifier used in an optical communications system of the type having an optical transmission block for transmitting wavelength division multiplexed optical signals through a fiber and an optical receiving block for receiving the optical signals through the fiber. The inventive amplifier includes: a circulator for outputting optical signals that are inputted through a first end connected to the fiber to a second end and for outputting optical signals that are reflected through the second end to a third end connected to the fiber; a dispersion-compensating fiber for compensating optical signals passing therethrough and for outputting optical signals after performing a Raman amplification; a pumping light source for pumping the dispersion-compensating fiber and for outputting a pumping light having a designated wavelength; a wavelength selective coupler for outputting the pumping light to the dispersion-compensating fiber; and, a reflector for reflecting the Raman pumped optical signals and for reflecting the optical signals back into the dispersion-compensating fiber.

7 Claims, 6 Drawing Sheets ical fiber amplifier includes: a first through fourth isolators 120, 160, 180, and 220; a first and second pumping light sources 140 and 210; a first and second wavelength selective couplers 130 and 200; a first and second erbium-doped fibers 150 and 190; and, a dispersion-compensating optical fiber 170.

DISPERSION-COMPENSATED RAMAN OPTICAL FIBER AMPLIFIER

CLAIM OF PRIORITY

This application claims priority to an application entitled, "Dispersion-Compensated Raman Optical Fiber Amplifier," filed in the Korean Industrial Property Office on Feb. 20, 2002 and assigned Serial No. 02-8955, the contents of which are hereby incorporated by reference.

BACKGROUND OF THE INVENTION

1. Field of the Invention

The present invention relates generally to optical communications systems and, more particularly, to an optical fiber amplifier disposed between an optical transmission block and an optical receiving block for amplifying signals.

2. Description of the Related Art

To keep abreast of the increasing demand for more data, wavelength-division-multiplexing (WDM) optical communication systems have been deployed to meet the increased transmission capacity. In WDM systems, the transmission capacity may be expanded by increasing the number of transmission channels or increasing transmission speed. The transmission speed required in the optical transmission has exponentially grown from 2.5 Gb/s to 10 Gb/s, and it is expected to increase more by newer developments. However, when the transmission speed is greater than 10 Gb/s, the occurrence of dispersion creates serious problems. To this end, a dispersion-compensating fiber (DCF) has been introduced to compensate the dispersion generated during the data transmission. When incorporating the dispersion-compensating fiber, it is necessary to amplify optical signals during transmission in order to compensate for the power loss of optical signals.

FIG. 1 is a simplified block diagram illustrating the configuration of a known dispersion-compensating, optical fiber amplifier. As shown in the drawing, the optical fiber amplifier includes a first through fourth isolators 120, 160, 180, and 220; a first and second pumping light sources 140 and 210; a first and second wavelength selective couplers 130 and 200; a first and second erbium-doped fibers 150 and 190; and, a dispersion-compensating optical fiber 170.

In operation, the first isolator 120 passes optical signals inputted in the optical fiber amplifier but blocks (or prevents) backwards-inputted light—for example, the light from the first wavelength selective coupler 130. The first wave selective coupler 130 couples optical signals from the first isolator 120 with the first pumped light, then outputs them to the first erbium-doped fiber 150. The first pumping light source 140 pumps the first erbium-doped fiber 150. For the first pumping light source, a laser diode can be used.

The first erbium-doped fiber 150 is pumped by the pumping light that is outputted from the first wavelength selective coupler 130, then outputs the amplified optical signals. The second isolator 160 passes optical signals that are inputted through the first erbium-doped fiber 150 while blocking any backwards-inputted light. The dispersion-compensating optical fiber 170 compensates the optical signal output from the second isolator 160. The length of the dispersion-compensating, optical fiber 170 is determined in consideration of the transmission distance of the optical signals. Normally, as the transmission distance of the optical signals is increased the degree of dispersion of the optical signals becomes severe. The third isolator 180 passes the optical signal output from the dispersion-compensating fiber 170 and blocks any backwards-inputted light.

The second erbium-doped fiber 190 is pumped by the pumping light that is inputted through the second wavelength selective coupler 200 and amplifies the optical signal output from the third isolator 180, then outputs the amplified optical signals. Particularly, the second erbium-doped fiber 190 amplifies the optical signals whose strength has been reduced while passing through the dispersion-compensating fiber 170. As such, the second wavelength selective coupler 200 couples the optical signal output from the third isolator 180 with the pumping light from the second pumping light source 210 and outputs them to the second erbium-doped fiber 190. Finally, the fourth isolator 220 passes the optical signal output from the second wavelength selective coupler 200 and blocks any backwards-inputted light.

As described above, the dispersion-compensating, optical fiber amplifier in the related art increases the total production costs as it uses a highly-priced lengthy dispersion-compensating fiber. Moreover, due to additional power loss of the optical signals, additional amplifying components, such as an erbium-doped fiber, pumping light, or wavelength selective coupler, are needed. Furthermore, to apply the dispersion-compensating amplifier to broadband high-density WDM systems, the amplifier must have a broad and flexible gain bandwidth, small noise figure, and a plurality of isolators for those purposes. This consequently makes the designing process much more complicated and by adding more components the entire production costs of the optical fiber amplifier is increased as well as the volume of the amplifier.

SUMMARY OF THE INVENTION

The present invention relates to a dispersion-compensating, Raman optical-fiber amplifier having low production costs and enhanced integration.

Accordingly, the dispersion-compensating, Raman optical fiber amplifier includes: a circulator for outputting inputted optical signals to a second end through a first end that is connected to the fiber and for outputting reflected optical signals through the second end into a third end that is connected to the fiber; a dispersion-compensating fiber for compensating inputted optical signals and reflected optical signals passing through the circulator, and at the same time for outputting the optical signals after performing a Raman amplification; a pumping means for Raman pumping the dispersion-compensating fiber; and, a reflector for reflecting the Raman pumped optical signals and for reflecting the optical signals back into the dispersion-compensating fiber.

BRIEF DESCRIPTION OF THE DRAWINGS

The above features and advantages of the present invention will become more apparent from the following detailed description when taken in conjunction with the accompanying drawings in which.

DESCRIPTION OF THE PREFERRED EMBODIMENT

Preferred embodiments of the present invention will be described herein below with reference to the accompanying drawings. For the purpose of clarity and simplicity, well-known functions or constructions are not described in detail as they would obscure the invention in unnecessary detail.

Figure 1:
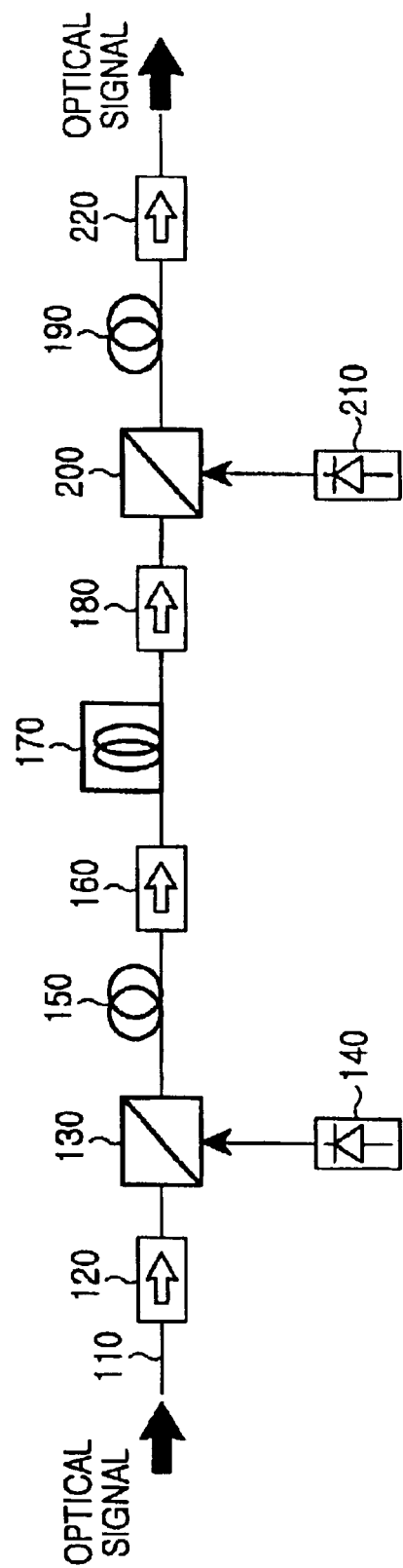
FIG. 1 is a schematic diagram of a dispersion-compensating optical fiber amplifier in a related art.
Figure 2:
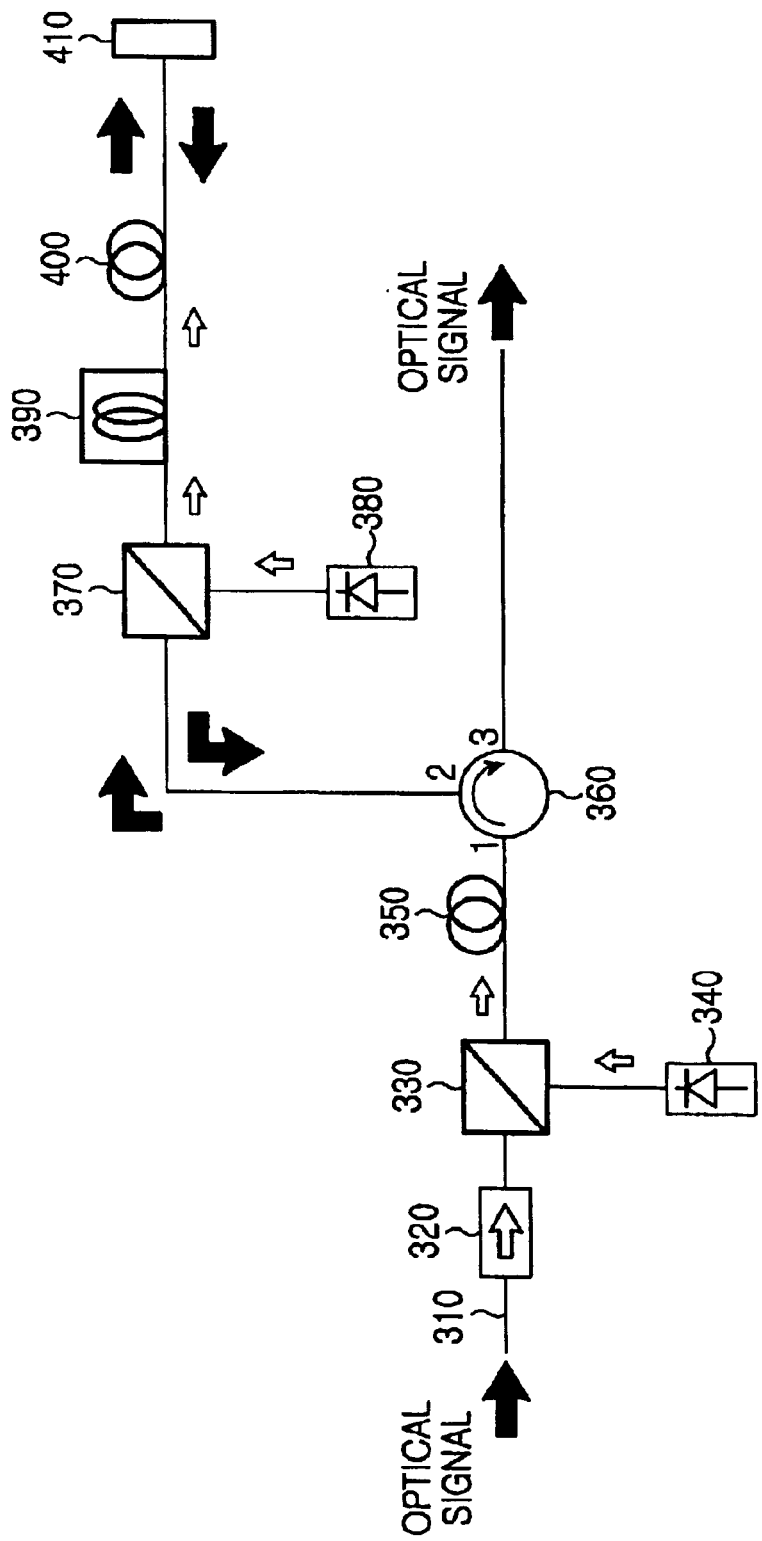
FIG. 2 is a schematic diagram of a dispersion-compensating optical fiber amplifier in accordance with a first preferred embodiment of the present invention.

FIG. 2 is a schematic diagram of the dispersion-compensating, optical fiber amplifier (also known as a Ramon optical fiber amplifier) in accordance with a first preferred embodiment of the present invention. As depicted in the drawing, the Raman optical fiber amplifier includes an isolator 320; a first and second wavelength selective couplers 330 and 370; a first and second pumping light sources 340 and 380; a first and second erbium-doped fibers 350 and 400; a circulator 360; a dispersion-compensating fiber 390; and, a reflector 410.

In operation, the isolator 320 passes optical signals of C-band wavelength bandwidth (Efficiency is the best at 1550 nm) that are inputted into the Raman optical fiber amplifier and prevents backwards-inputted light—that is, the light inputted through the first wavelength selective coupler 330. The first wavelength selective coupler 330 couples the optical signal output from the isolator 320 to the 980 nm wavelength-pumping light pumped by the first pumping light source 340, then outputs them to the first erbium-doped fiber 350. Preferably, a 980/1550 nm wavelength selective coupler is used for the first wavelength selective coupler 330. The first pumping light source 340 pumps the first erbium-doped fiber 350. More specifically, the first pumping light source 340 excites erbium ions in the first erbium-doped fiber 350. A laser diode outputting 980 nm wavelength-pumping light may be used as the pumping light source 340. The first erbium-doped fiber 350 is pumped by pumping light output from the first wavelength selective coupler 330 and amplifies the optical signal output from the first wavelength selective coupler 330, then outputs the amplified optical signals.

The circulator 360 outputs optical signals that have been amplified by the first erbium-doped fiber 350 and inputted through the first end, to the second end, and outputs optical signals inputted through the second end to the third end, which is connected to the fiber 310.

Meanwhile, the second wavelength selective coupler 370 couples the optical signal output from the second end of the circulator 360 with the pumping light output from the second pumping light source 380 and then outputs them to the dispersion-compensating fiber 390. Note that the second wavelength selective coupler 370 also outputs optical signals that are reflected from the dispersion-compensating fiber 390 back into the second end of the circulator 360. A 1450/1550 nm wavelength selective coupler may be used for the second wavelength selective coupler 370.

With continued reference to FIG. 2, the second pumping light source 380 pumps the dispersion-compensating fiber 390 and the second erbium-doped fiber 400. A laser diode that can output a pumping light with 1450 nm bandwidth may be used as the second pumping light source 380.

The dispersion-compensating fiber 390 compensates optical signal output from the second wavelength selective coupler 370 as well as the dispersion of optical signals that are reflected from the second erbium-doped fiber 400, and at the same time performs Raman amplification on the optical signals before outputting the same. In order to compensate the dispersion corresponding to 80 km of communication, the dispersion-compensating fiber 390 uses a single-mode fiber having a length of 40 km and an insertion loss of 6 dB. In a normal situation where a 80 km dispersion-compensating fiber is required, the present invention can reduce the required length of the dispersion-compensating fiber 390 to be half, as optical signals requiring dispersion compensation pass through the dispersion-compensating fiber 390 to achieve the same effect due to the reflection of signals using the reflector 410. In addition, the dispersion-compensating fiber 390 performs a Raman amplification on the optical signals that are inputted therethrough. Note that the dispersion-compensating fiber 390 is pumping a 1450 nm wavelength light. Here, the wavelength of the pumping light could be changed depending on the wavelength of the optical signal, and alternatively a designated wavelength-bandwidth pumping light may be implemented.

The second erbium-doped fiber 400 is pumped by a remaining pumping light output from the dispersion-compensating fiber 390 and serves to amplify the optical signal output from the dispersion-compensating fiber 390, and finally outputs the amplified optical signals. Moreover, the second erbium-doped fiber 400 amplifies optical signals that are reflected by the reflector 410. The reflector 410 reflects optical signal output from the second erbium-doped fiber 400 and redirects them back into the second erbium-doped fiber 400. As for the reflector 410, a fiber grating that performs a total reflection on the light with a C-band wavelength is preferred.

Figure 3:
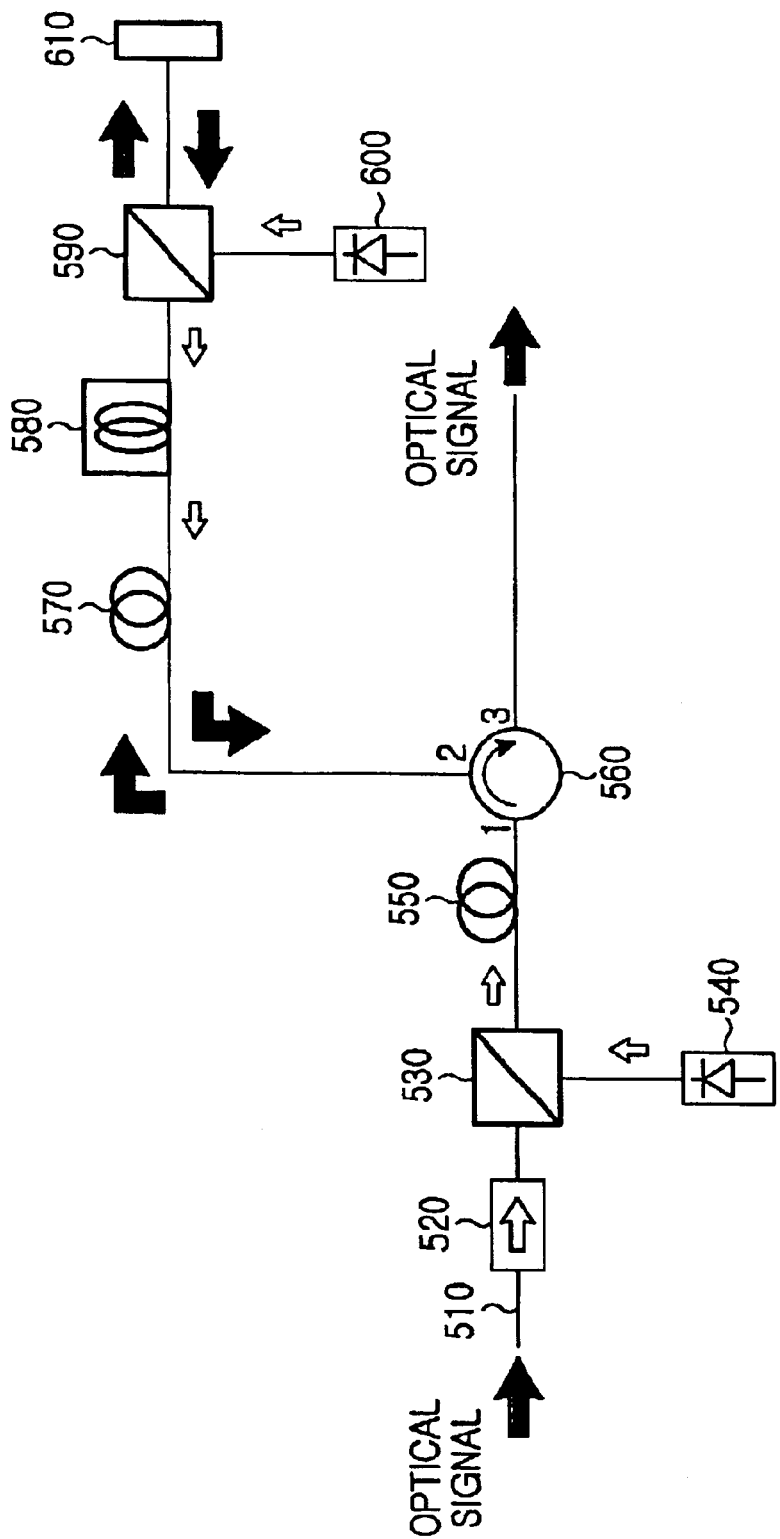
FIG. 3 is a schematic diagram of a dispersion-compensating optical fiber amplifier in accordance with a second preferred embodiment of the present invention.

FIG. 3 is a schematic diagram of a dispersion-compensating, optical fiber amplifier in accordance with a second preferred embodiment of the present invention. Similar to before, the Raman optical fiber amplifier includes an isolator 520, a first and second wavelength selective couplers 530 and 580, a first and second pumping light sources 540 and 600, a first and second erbium-doped fibers 550 and 570, a circulator 560, a dispersion-compensating fiber 580, and a reflector 610. To avoid redundancy, the description for the isolator 520, the first pumping light source 540, the first wavelength selective coupler 530, and the first erbium-doped fiber 550 will be omitted as the construction and operation are essentially the same as that described above with respect to FIG. 2.

In operation, the circulator 560 receives an amplified signal output from the first erbium-doped fiber 550 via the first end and forwards them to the second end, and at the same time forwards any optical signals received through the second end to the third end, which is connected to the optical fiber 510.

The second erbium-doped fiber 570 is pumped by the remaining pumping light inputted through the dispersion-compensating fiber 580, and at the same time amplifies the optical signal output from the circulator 560. In addition, the second erbium-doped fiber 570 amplifies optical signals that are reflected and coming from the dispersion compensating fiber 580. The dispersion-compensating fiber 580 is comprised of a 40 km dispersion-compensating fiber with an insertion loss of 6 dB.

The second pumping light source 600 pumps the dispersion-compensating fiber 580 and the second erbium-doped fiber 570 via the second wavelength selective coupler 590. A laser diode is preferred as the pumping light source 600 and outputs the pumping light having a 1450 nm bandwidth. The second wavelength selective coupler 590 couples the optical signals that are reflected by the reflector 610 with the pumping light from the second pumping light source 600, then outputs them to the dispersion-compensating fiber 580. At the same time, the second wavelength selective coupler 590 outputs optical signal output from the dispersion-compensating fiber 580 towards the reflector 610. In the embodiment, a 1450/1550 nm wavelength selective coupler may be used for the second wavelength selective coupler 590.

Figure 4:
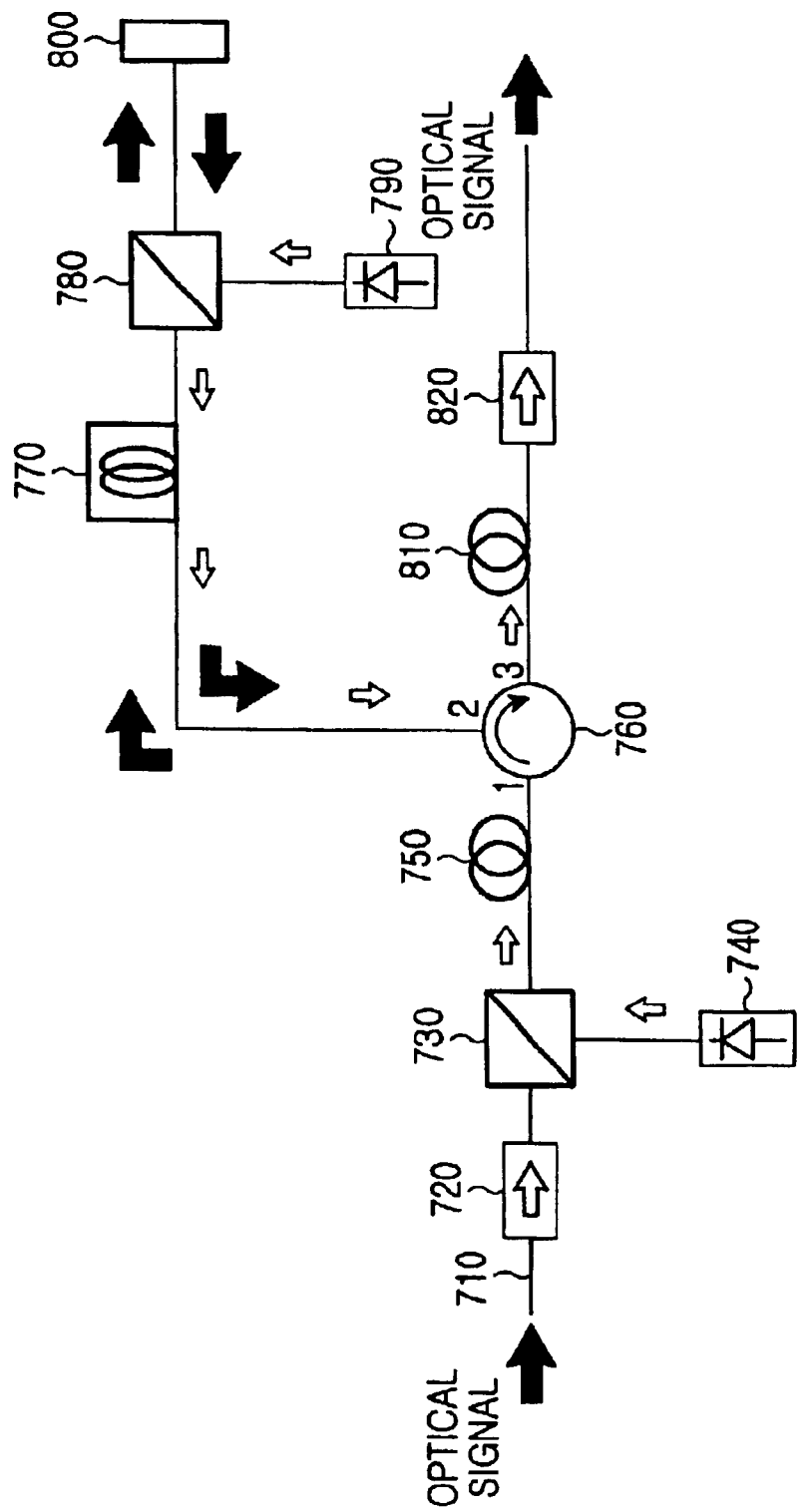
FIG. 4 is a schematic diagram of a dispersion-compensating optical fiber amplifier in accordance with a third preferred embodiment of the present invention.

FIG. 4 is a schematic diagram of a dispersion-compensating, optical fiber amplifier in accordance with a third preferred embodiment of the present invention. The Raman optical fiber amplifier includes a first and second isolators 720 and 820, a first and second wavelength selective couplers 730 and 780, a first and second pumping light sources 740 and 790, a first and a second erbium doped fibers 750 and 810, a circulator 760, a dispersion-compensating fiber 770, and a reflector 800. To avoid redundancy, the function of the first isolator 720, the first pumping light source 740, the first wavelength selective coupler 730, and the first erbium-doped fiber 750 will be omitted as they are described in the preceding paragraph with respect to FIG. 2.

In operation, the circulator 760 receives amplified signal output from the first erbium-dope fiber 750 through the first end and outputs them to the second end. At the same time, the circulator 760 outputs optical signals received therein via the second end and forward them to the third end, which is connected to the fiber 710. The dispersion-compensating fiber 770 compensates optical signal output from the circulator 760 as well as the optical signals that are reflected from the second wavelength selective coupler 780. At the same time, the dispersion-compensating fiber 770 performs a Raman amplification on the optical signals passing therethrough. The dispersion-compensating fiber 770 is comprised of a 40 km dispersion-compensating fiber, of which insertion loss is 6 dB, and it is pumped by the pumping light outputted from the second wavelength selective coupler 780. The second pumping light source 790 pumps the dispersion-compensating fiber 770 and the second erbium-doped fiber 810. A preferred second pumping source 790 is a laser diode that outputs a 1450 nm-wavelength pumping light.

The second wavelength selective coupler 780 couples optical signals that are reflected from the reflector 800 with the pumping light that is inputted from the second pumping light source 790, then outputs them to the dispersion-compensating fiber 770. Moreover, the second wavelength selective coupler 780 outputs optical signals that are inputted from the dispersion-compensating fiber 770 to the reflector 800. A preferred second wavelength selective coupler 780 is a 1450/1550 nm wavelength selective coupler.

The reflector 800 reflects optical signals inputted from the second wavelength selective coupler 780 and forward them back into the dispersion-compensating fiber 770. As for the reflector 800, a fiber grating that performs a total reflection on the light with a C-band wavelength is used. The second erbium-doped fiber 810 is pumped by the remaining pumping light inputted through the circulator 760 and amplifies optical signals inputted through the circulator 760, then finally outputs the amplified optical signals. The second isolator 820 passes 1550 nm wavelength-optical signals inputted from the second erbium-doped fiber 810 and blocks backwards-inputted light.

Figure 5:
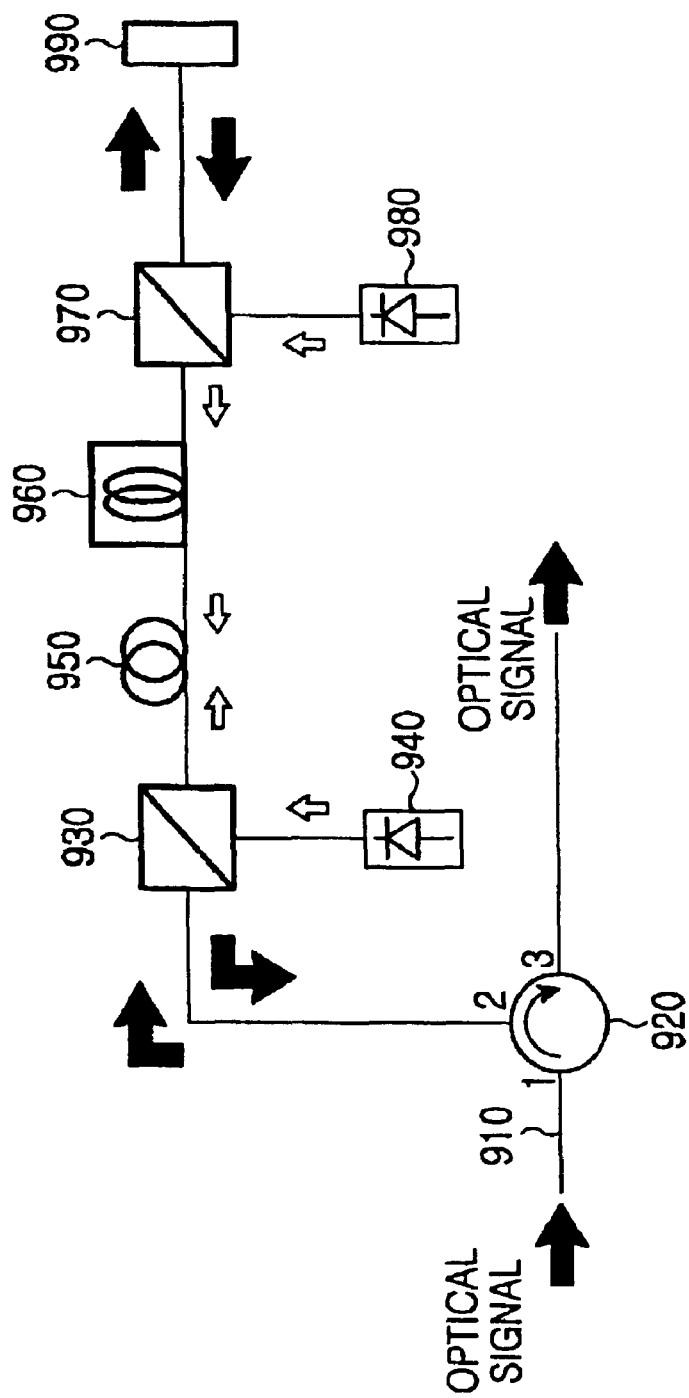
FIG. 5 is a schematic diagram of a dispersion-compensating optical fiber amplifier in accordance with a fourth preferred embodiment of the present invention; and, FIG. 6 is a schematic diagram of a dispersion-compensating optical fiber amplifier in accordance with a fifth preferred embodiment of the present invention.

FIG. 5 is a schematic diagram of a dispersion-compensating, optical fiber amplifier in accordance with a fourth preferred embodiment of the present invention. The Raman optical fiber amplifier includes a circulator 920, a first and second wavelength selective couplers 930 and 970, a first and second pumping light sources 940 and 980, an erbium-doped fiber 950, dispersion-compensating fiber 960, and a reflector 990.

In operation, the circulator 920 forwards optical signals that are inputted through the first end to the second end and outputs optical signals that are inputted through the second end to the third end, which is connected to the fiber 910. The first pumping light source 940 pumps the erbium-doped fiber 950 and the dispersion-compensating fiber 960. As for the first pumping light source 940, a laser diode that outputs 1450 nm bandwidth-pumping light can be used. The first wavelength selective coupler 930 couples optical signals inputted through the circulator 920 with the pumping light from the first pumping light source 940, then outputs them to the erbium doped fiber 950. At the same time, the first wavelength selective coupler 930 outputs optical signals inputted from the erbium-doped fiber 950 to the circulator 920. A preferred first wavelength selective coupler 930 is a 1450/1550 nm wavelength selective coupler.

The erbium-doped fiber 950 is pumped by pumping light that is inputted through the first wavelength selective coupler 930 in a forward direction and the remaining pumping light that is inputted through the dispersion-compensating fiber 960 in a reverse direction. Moreover, the erbium-doped fiber 950 amplifies optical signals that are reflected and outputted from the dispersion-compensating fiber 960.

The dispersion-compensating fiber 960 compensates optical signal output from the erbium-doped fiber 950 and from the second wavelength selective coupler 970. Meanwhile, the dispersion-compensating fiber 960 performs a Raman amplification on the optical signals before outputting the same. The dispersion-compensating fiber 960 is comprised of a 40 km dispersion-compensating fiber, of which insertion loss is 6 dB, and it is pumped by the pumping light that is inputted through the second wavelength selective coupler 970.

The second wavelength selective coupler 970 couples optical signals that are reflected from the reflector 900 with the pumping light from the second pumping light source 980 and outputs optical signals inputted from the dispersion-compensating fiber 960 to the reflector 990. A preferred second wavelength selective coupler 970 is a 1450/1550 nm wavelength selective coupler. The second pumping light source 980 pumps the dispersion-compensating fiber 960, and a preferred second pumping source 980 is a laser diode that outputs a 1450 nm-wavelength pumping light. The reflector 990 reflects optical signals inputted from the second wavelength selective coupler 970 and forwards them back into the dispersion-compensating fiber 960. As for the reflector 990, a fiber grating that performs a total reflection on the light with a C-band wavelength is used.

Figure 6:
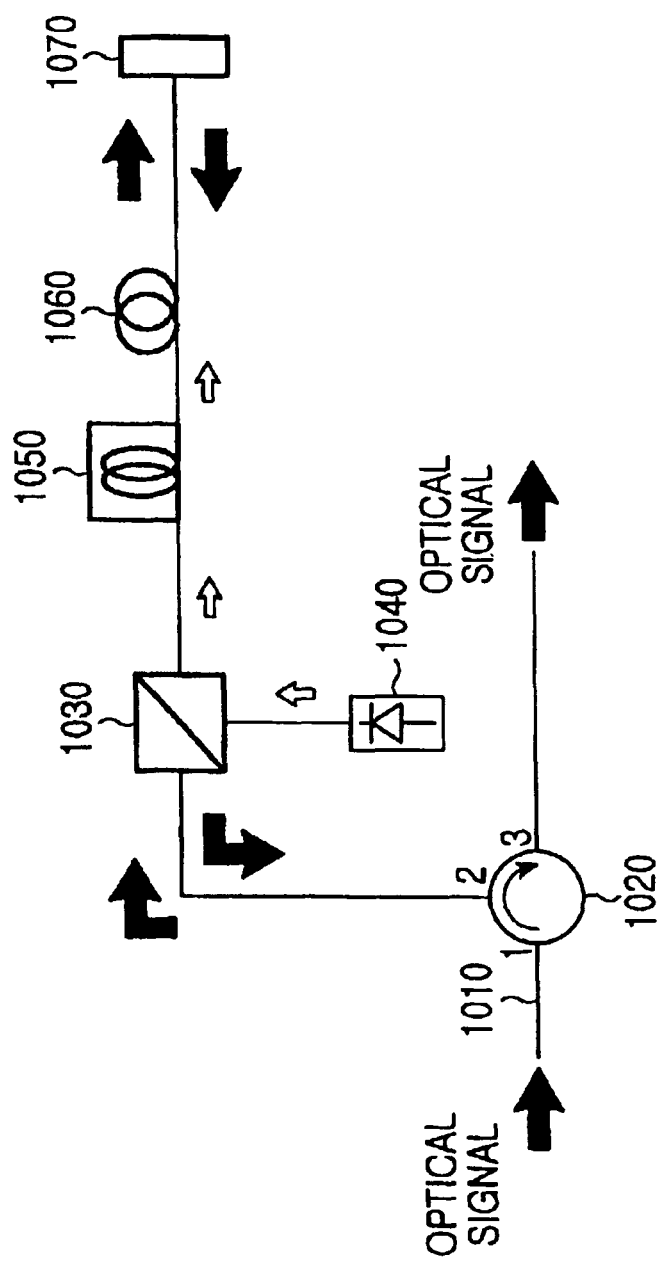

FIG. 6 is a schematic diagram of a dispersion compensating, optical fiber amplifier in accordance with a fifth preferred embodiment of the present invention. The Raman optical fiber amplifier includes a circulator 1020, a wavelength selective coupler 1030, a pumping light source 1040, a dispersion-compensating fiber 1050, an erbium-doped fiber 1060, and a reflector 1070.

In operation, the circulator 1020 outputs optical signals that are inputted through the first end to the second end and outputs optical signals that are inputted through the second end to the third end connected to the fiber 1010. The wavelength selective coupler 1030 couples optical signals inputted through the circulator 1020 with the pumping light from the first pumping light source 1040, then outputs them to the dispersion-compensating fiber 1050. A preferred wavelength selective coupler 1030 is a 1450/1550 nm wavelength selective coupler. The pumping light source 1040 pumps the dispersion-compensating fiber 1050 and the erbium-doped fiber 1060. As for the pumping light source 1040, a laser diode that outputs 1450 nm bandwidth—pumping light can be used.

The dispersion-compensating fiber 1050 compensates optical signals that are inputted through the wavelength selective coupler 1030 and the dispersion of optical signals that are reflected back through the erbium-doped fiber 1060. At the same time, the dispersion-compensating fiber 1050 performs a Raman amplification on the optical signals reflected back from the erbium-doped fiber 1060 before outputting the same. The dispersion-compensating fiber 105 is comprised of a 40 km dispersion-compensating fiber, of which insertion loss is 6 dB, and it is pumped by the pumping light that is inputted through the wavelength selective coupler 1030.

The erbium-doped fiber 1060 is pumped by the remaining pumping light that is inputted through the dispersion-compensating fiber 1050 and amplifies optical signals inputted through the dispersion-compensating fiber 1050 and optical signals that are reflected by the reflector 1070. The reflector 1070 reflects optical signals inputted from the erbium-doped fiber 1060 back into the erbium-doped fiber 1060. As for the reflector 1070, a fiber grating that performs a total reflection on the light with a C-band wavelength is used.

In conclusion, the dispersion-compensating, Raman optical fiber amplifier embodying the principles of the present invention can reduce the total production costs and improve integration of the amplifier, by reducing the length of the dispersion-compensating fiber with the use of a circulator and a reflector and by enabling the dispersion-compensating fiber to perform the Raman amplification. In addition, the dispersion-compensating, Raman optical fiber amplifier according to the present invention has other merits; for example, a relatively broad and a flexible gain bandwidth, and a low noise figure can be achieved using the inventive configuration explained herein. Furthermore, the dispersion-compensating, Raman optical fiber amplifier according to the present invention does not require any complicated design or separate components, and as a result thereof, a total production costs and volume of the optical fiber amplifier can be greatly reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A dispersion-compensating, Raman optical fiber amplifier used in an optical communications system, comprising:
    a circulator having a first end, a second end, and a third end for forwarding input optical signals received therein via the first end to the second end and for forwarding optical signals received therein via the second end to the third end;
    a dispersion-compensating fiber coupled to the second end of the circulator for amplifying optical signals passed therethrough;
    a pumping light source for outputting a pump light having a predetermined wavelength towards the dispersion-compensating fiber;
    a wavelength selective coupler coupled to the output of the pumping light source for forwarding the pump light to the dispersion-compensating fiber;
    a reflector coupled to the output of the dispersion-compensating fiber for reflecting optical signal output back into the dispersion-compensating fiber; and
    an erbium-doped fiber, disposed between the dispersion-compensating fiber and the reflector, for receiving the output of the dispersion-compensating fiber and for outputting backward ASE (amplified spontaneous emission) to the dispersion compensating fiber.

2. A dispersion-compensating, Raman optical fiber amplifier used in an optical communications system, comprising:
    a circulator having a first end, a second end, and a third end for forwarding input optical signals received therein via the first end to the second end and for forwarding optical signals received therein via the second end to the third end;
    a dispersion-compensating fiber coupled to the second end of the circulator for amplifying optical signals passed therethrough;
    a pumping light source for outputting a pump light having a predetermined wavelength towards the dispersion-compensating fiber;
    a wavelength selective coupler coupled to the output of the pumping light source for forwarding the pump light to the dispersion-compensating fiber;
    a reflector coupled to the output of the dispersion-compensating fiber for reflecting optical signal output back into the dispersion-compensating fiber; and
    an erbium-doped fiber, disposed between the circulator and the dispersion-compensating fiber, for receiving the output of the dispersion-compensating fiber and for outputting backward ASE (amplified spontaneous emission) to the dispersion compensating fiber.

3. A dispersion-compensating, Raman optical fiber amplifier used in an optical communications system, comprising:
    a circulator having a first end, a second end, and a third end for forwarding input optical signals received therein via the first end to the second end and for forwarding optical signals received therein via the second end to the third end;
    a dispersion-compensating fiber coupled to the second end of the circulator for amplifying optical signals passed therethrough;
    a pumping light source for outputting a pump light having a predetermined wavelength towards the dispersion-compensating fiber;
    a wavelength selective coupler coupled to the output of the pumping light source for forwarding the pump light to the dispersion-compensating fiber;
    a reflector coupled to the output of the dispersion-compensating fiber for reflecting optical signal output back into the dispersion-compensating fiber; and
    an erbium-doped fiber, coupled to receive the output of the dispersion-compensating fiber and for outputting backward ASE (amplified spontaneous emission) to the dispersion compensating fiber.

4. The dispersion-compensating, Raman optical fiber amplifier as defined in claim 1, further comprising:
    an erbium-doped fiber coupled to the output of the circulator for amplifying optical signals traveling in a direction towards the second end of the circulator;
    a light source for outputting a pump light having a predetermined wavelength towards the erbium-doped fiber; and, a wavelength selective coupler for outputting the pump from the light source with the output of the erbium-doped fiber.

5. The dispersion-compensating, Raman optical fiber amplifier as defined in claim 2, further comprising:

an erbium-doped fiber coupled to the output of the circulator for amplifying optical signals traveling in a direction towards the second end of the circulator;

a light source for outputting a pump light having a predetermined wavelength towards the erbium-doped fiber; and, a wavelength selective coupler for outputting the pump from the light source with the output of the erbium-doped fiber.

6. The dispersion-compensating, Raman optical fiber amplifier as defined in claim 3, further comprising:

an erbium-doped fiber coupled to the output of the circulator for amplifying optical signals traveling in a direction towards the second end of the circulator;

a light source for outputting a pump light having a predetermined wavelength towards the erbium-doped fiber; and, a wavelength selective coupler for outputting the pump from the light source with the output of the erbium-doped fiber.

7. A dispersion-compensating, Raman optical fiber amplifier used in an optical communications system comprising:

a circulator having a fist end, a second end, and a third end for forwarding input optical signals received therein through the first end to the second end and for forwarding reflected optical signals received therein through the second end to the third end;

an erbium-doped fiber coupled to the second end output of the circulator for amplifying optical signal passing therethrough;

a first pumping light source for outputting a pumping light having a designated wavelength to the erbium-doped fiber;

a first wavelength selective coupler for coupling the pumping light output from the first pumping light source to the erbium-doped fiber;

a dispersion-compensating fiber for compensating amplified optical signal output from the erbium-doped fiber and dispersion of the reflected optical signals passing therethrough;

a second pumping light source for outputting a pumping light having a designated wavelength to the dispersion-compensating fiber and for pumping the erbium-doped fiber so that a backward ASE (backward amplified spontaneous emission) can be generated to pump dispersion-compensating fiber;

a second wavelength selective coupler for coupling a pumping light output from the second pumping light source to the dispersion compensating fiber; and, a reflector coupled to the output of the dispersion-compensating fiber for reflecting optical signal output back into the dispersion-compensating fiber.

\* \* \* \* \*

UNITED STATES PATENT AND TRADEMARK OFFICE
CERTIFICATE OF CORRECTION

PATENT NO. : 6,898,003 B2
DATED : May 24, 2005
INVENTOR(S) : Seong-Taek Hwang and Hyung-Jin Kwon It is certified that error appears in the above-identified patent and that said Letters Patent is hereby corrected as shown below:

<u>Title page,</u>
Item [75], Inventor, should read -- Hyung-Jin Kwon --

Signed and Sealed this

Nineteenth Day of July, 2005

JON W. DUDAS
*Director of the United States Patent and Trademark Office*